United States Patent [19]
Golden et al.

[11] Patent Number: 6,014,413
[45] Date of Patent: *Jan. 11, 2000

[54] TIME-SHIFTED WEIGHTING FOR SIGNAL PROCESSING

[75] Inventors: Glenn David Golden, Boulder, Colo.; Carol Catalano Martin, Fair Haven, N.J.; Nelson Ray Sollenberger, Tinton Falls, N.J.; Jack Harriman Winters, Middletown, N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,896

[22] Filed: May 2, 1997

[51] Int. Cl.[7] .............................. H04L 1/02; H03G 11/04
[52] U.S. Cl. .............................................. 375/347; 333/18
[58] Field of Search .................................... 375/229, 230, 375/231, 232, 234, 235, 267, 346, 347; 333/18, 28

[56] References Cited

U.S. PATENT DOCUMENTS

| 3,737,781 | 6/1973 | Deerkoski | 324/614 |
|---|---|---|---|
| 4,984,253 | 1/1991 | Trout | 375/346 |
| 5,140,615 | 8/1992 | Jasper et al. | |
| 5,265,122 | 11/1993 | Rasky et al. | |
| 5,490,180 | 2/1996 | Muto | |
| 5,796,779 | 8/1998 | Nussbaum et al. | 375/267 |
| 5,875,216 | 2/1999 | Martin | 375/347 |

FOREIGN PATENT DOCUMENTS

WO 98/01963  1/1988  WIPO .

OTHER PUBLICATIONS

David J. Goodman, "Trends in Cellular and Cordless Communications", IEEE Communications Magazine, vol. 29, pp. 31–40, (Jun. 1991).

Primary Examiner—Stephen Chin
Assistant Examiner—Albert Park

[57] ABSTRACT

A system and method for applying channel weights in a communication system are presented. The application of weights derived from a sample window is time-shifted into that sample window, decreasing the effects of channel variation and partially compensating for degradation due to differential detection.

22 Claims, 5 Drawing Sheets

TIME-SHIFTED WEIGHTING FOR SIGNAL PROCESSING

BACKGROUND OF THE INVENTION

1. Field of Invention

The invention relates to the field of signal processing technology, and particularly to the weighting and combining of signals used in antenna arrays and other communication systems.

2. Description of Related Art

In communication receiving stations, for example mobile cellular installations, systems equipped with multiple-antenna arrays offer improved receiver performance. The signals arriving on the antenna channels are sampled and then weighted and combined to improve performance. Those antenna arrays, for instance as discussed in the U.S. Patent Application entitled "ADAPTIVE COMMUNICATION SYSTEM AND METHOD USING UNEQUAL WEIGHTING OF INTERFERENCE AND NOISE", filed May 1, 1997, and assigned to the same assignees as this application, incorporated here by reference, can among other things reduce the effects of multipath fading and interference by deriving weights for each antenna channel that lead to improved receiver performance. In such systems it is necessary to accurately sample the incoming data stream to develop the parameters, such as estimated noise and interference, needed to generate high-performance weights. The weights developed from a window of K past samples, where illustratively, K=14, described in the aforementioned U.S. Patent Application are applied to the next-arriving sample in the data stream, as illustrated in FIG. 4 herein. Once the symbol corresponding to that sample is detected, the window used to generate weights moves one time unit to the right, and the newly generated weights (using 13 prior window symbols plus the just-detected symbol) are applied to the subsequent symbol, in sliding fashion.

This approach of applying currently generated weights to the next-arriving symbol has the advantage of straightforward implementation, but falls short of ideal for at least two reasons. One is that the channel is varying over the K-symbol window used to sample the channel. In terms of channel variation, as illustrated herein in FIGS. 4 and 5 when incoming data streams are sampled, in the typical approach to weight application as outlined in the forementioned U.S. Patent Application, the weights derived from the (14-symbol) window at time t are applied to the next-arriving signal sample, at time (t+1).

However, the weight derived from the window is typically most representative of the instantaneous condition of the channel, not at the end, but in the middle of the sample window. By the time the next-arriving data symbol appears, the characteristics of the channel can vary significantly, particularly in fast-fading environments such as mobile radio. Applying weights which most accurately represent the channel several symbols ago to the next-resolved symbol can therefore degrade performance.

Moreover, in terms of encoding technique, data transmitted in the industry standard IS-136 format is always transmitted in differentially encoded (phase shift) form. On the detection side, either coherent or differential detection can be used, as understood by persons skilled in the art. For instance, current commercial base station equipment typically detects data arriving from an antenna or antenna array by differential detection, that is, detecting phase shifts to decode data. Differential detection typically requires 1 dB greater signal-to-noise ratio (SNR) than absolute phase (coherent) techniques with an ideal phase reference.

However, the coherently-sliced reference signals used to assess the channel and generate initial weights are themselves detected coherently, in the weight-adaptive technique described in the foregoing patent application. In that approach the channel weights may be generated for example by an outboard signal processing appliqué which determines channel characteristics coherently, then passes weighted and combined signals to an existing base station unit which performs data detection differentially.

Besides channel variation, samples taken at one stage of a receiver system therefore have different noise, interference, and other characteristics which when introduced into another and different type of processing in the system, cause added errors and signal degradation. In conventional approaches to the sampling of data streams to generate channel weights, neither channel variation nor the fact that various stages of data processing may be carried out differently, are taken into account.

SUMMARY OF THE INVENTION

The invention overcoming these and other shortcomings is in one aspect a system and method in which signal weights applied to incoming data are time-shifted into the sample window from which the weights are generated.

In another aspect the invention provides a system and method which generates improved base station output from antenna arrays.

In another aspect the invention provides a system and method which improves receiver performance when the signals used to compute the array weights are coherently detected, while the array output signal is differentially detected.

The invention achieving these and other advantages in one respect relates to an apparatus constructed and method adapted to apply weights generated from a window of coherently-sliced received signal samples, to the signal samples contained in that window.

BRIEF DESCRIPTION OF THE DRAWINGS

The invention will be described with reference to the following drawings.

DETAILED DESCRIPTION OF PREFERRED EMBODIMENTS

Figure 3:
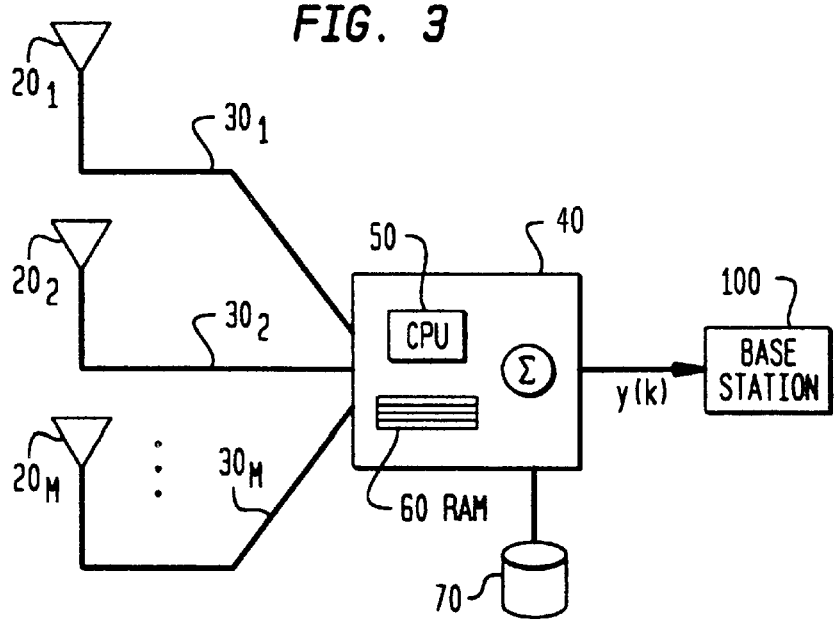
FIG. 3 illustrates a block diagram in another aspect of a communication apparatus using the weight application technique, according to the invention.

As illustrated in FIG. 3, the sampling system and method of the invention relates to a communication station having an antenna array, consisting of a plurality of generally matched antenna elements, $20_1$ through $20_M$. Each antenna element receives RF signals and passes the received signals $30_1$ through $30_M$ to processing unit 40, typically containing a CPU 50, electronic memory 60, fixed storage 70, and signal processing and related circuitry and software, connected with appropriate bus and other circuitry, as will be appreciated by persons skilled in the art. Processing unit 40 is constructed to take samples and apply weights necessary to carry out the system and method of the invention, as described in the foregoing U.S. Patent Application and herein.

Figure 6:
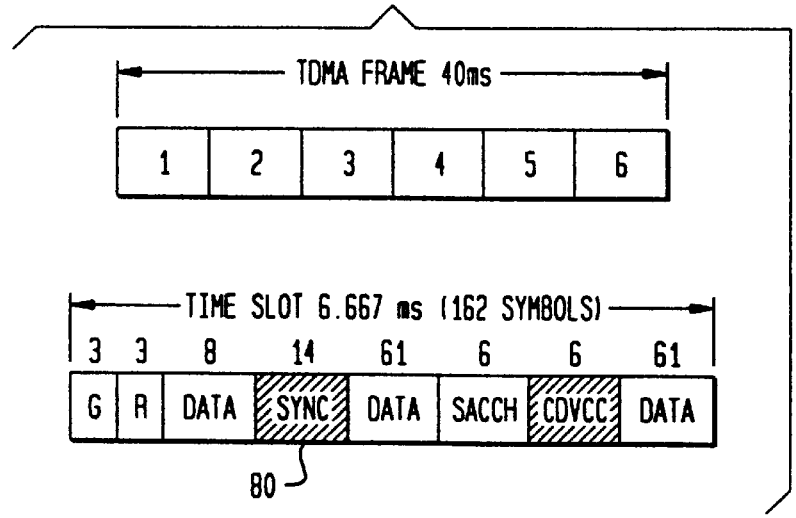
FIG. 6 illustrates the data in one mobile-to-base frame of IS-136 data illustratively used in the invention.

In an advantageous embodiment, the sampling system and method of the invention is employed in a mobile communication system base station conforming to the IS-136 (TDMA) standard. As illustrated in FIG. 6, in the IS-136 slot structure, each user is allotted two time slots (at full rate), e.g. time slots 3 and 6, within each TDMA frame. For mobile to base station transmission, each time slot consists of 3 guard symbols, 3 ramp symbols, 130 data symbols, a 14-symbol synchronization sequence 80, and 6-symbol SACCH and CDVCC sequences. See, for example, D. L. Goodman, "Trends in Cellular and Cordless Communications", IEEE Communications Magazine, Vol. 29, June 1991, pages 31–40, incorporated by reference.

Processing unit 40 has the synchronization sequence 80 stored in memory 60, and uses the knowledge of that sequence to acquire the initial values of the channel weights for the base station, based on received signal samples reflecting that data.

Once initial training is achieved, processing unit 40 acquires samples for use in weight generation using a coherently-sliced version of the weighted (by w(k)) next-arriving signal samples (x(k)) as the reference signal d(k), according to:

$$d(k)=quan(w^T(k)x(k)) \qquad (1)$$

Figure 4:
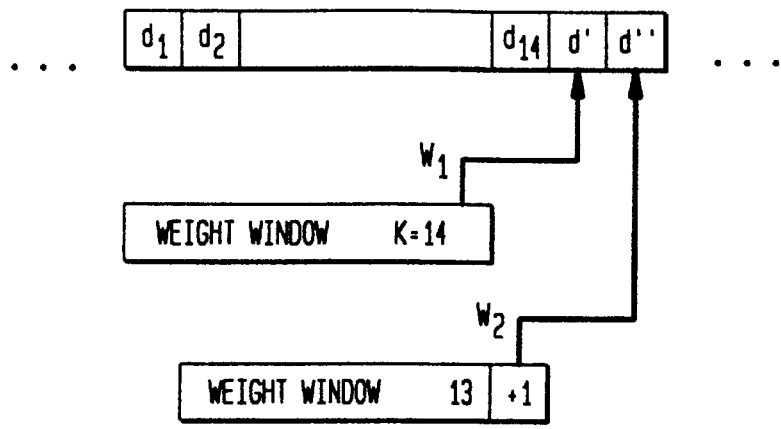
FIG. 4 illustrates the sliding window approach of weight application.
Figure 5:
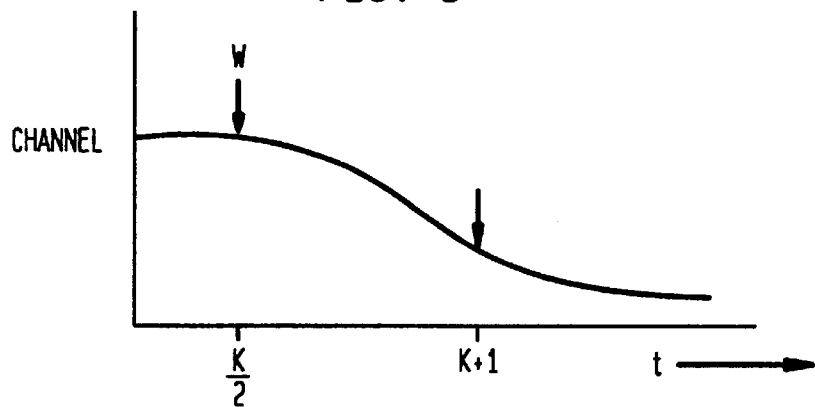
FIG. 5 illustrates the effect of channel variation on the sliding window approach shown in FIG. 4.

In this expression, quan() represents coherent detection of the π/4 DQPSK signal. In order to employ commonly used weighting techniques, processing unit 40 must perform coherent detection to generate the data-derived reference signal, for further channel weighting, as illustrated in FIG. 4. Coherent detection by processing unit 40 requires about 1 dB lower SNR for the same BER (Bit Error Rate), and thus is more reliable than differential detection.

In IS-136 communication implementations, actual tracking performance deviates from ideal tracking due to at least three factors. First, the transmission channel can vary over the window of length K used to take samples for weight generation. Under reasonable conditions of a 1.9 GHz carrier frequency (PCS) at vehicle speeds of 60 mph, fading rates can reach 184 Hz, and at such rates the phase of transmission channels can change a few degrees each symbol. As detailed in the foregoing copending U.S. Patent Application, weights are calculated over a window of K symbols, to be applied to the next-arriving signal samples to generate the next data-derived reference signal, just after the window. Thus, degradation due to channel variation increases with K.

Second, degradation occurs due to error in weight calculations, and SNR degradation due to noise depends on the ratio K/M, where M is the number of antennas. For M=4 and K=8, degradation is 3 dB, and decreases with increasing K.

Third, degradation occurs due to error propagation. If processing unit 40 uses a coherently-sliced data-derived reference signal to acquire weights, detection errors increase the error in those weights. Since this increases BER, error propagation can occur, resulting in loss of tracking and a large error burst that can last until the end of the time slot. Degradation due to detection errors decreases with increasing K.

Figure 7:
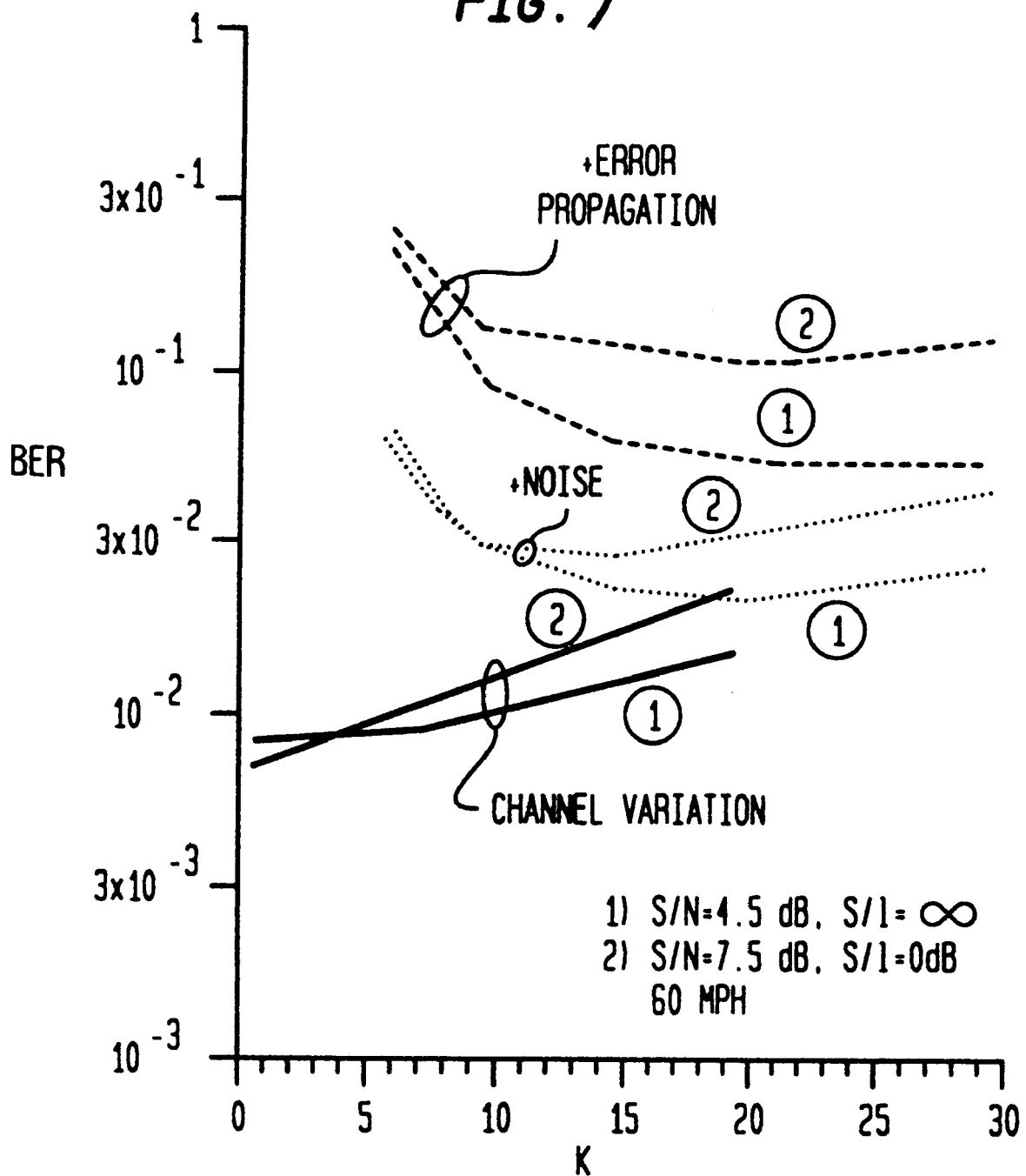
FIG. 7 illustrates data showing the effects of certain types of signal degradation in a mobile communication environment.

FIG. 7 illustrates BER versus sample window length, K for the above three types of degradation with a fading rate of 184 Hz. The two cases are i) SNR=4.5 dB with noise only, and ii) SNR=6.5 dB with an equal power interferer (SIR=0 dB). The data are for coherent detection of the antenna array output signal, but the inventors have obtained similar results using differential detection. These SNR levels were chosen because they result in a BER of $10^{-2}$ with ideal weights.

FIG. 7 indicates performance with channel variation only (known $R_{xx}$ and $r_{xd}$, but averaged over a rectangular window of length K), channel variation and noise (Equation 3 below with an ideal reference signal), and all three impairments. With channel degradation only, the degradation increases monotonically with K. When the effect of noise in the estimation is included, BER is dominated by the effect of noise for small K, but BER decreases with K until the effect of channel variation becomes significant. Error propagation is seen to dominate the other two effects, especially with small K. As a result, the BER decreases with K until K is about 14, but remains about the same for K>14. Thus, a window size of 14 yields close to the best performance for these cases. However, even the cases discussed have an order of magnitude increase in BER due to the degradations even with K=14.

In adaptive communications systems in which the system and method of the invention is illustratively employed, and as detailed in the aforementioned copending application, the antenna array output signal is given by:

$$y(k)=w^T(k)x(k) \qquad (2)$$

where
$w=[w_1, w_2, \ldots, w_M]^T$, (T meaning transpose) and
$x=[x_1, x_2, \ldots, x_M]^T$
The weights are computed as $$w(k+1)=\hat{R}_{xx}(k)\hat{r}_{xd}(k) \qquad (3)$$

In these expressions, a sliding window of length K is used to determine the weights for combining the antenna array $20_1 \ldots 20_M$ received signals, from which a next coherently sliced data-derived reference signal is obtained, in turn used to produce the next weight, and so on. That is, the weight derived from the sliding window is applied to the next-arriving signal samples without regard to the optimality of applying that weight to a signal outside the window which generated that weight.

In fact, the weights generated according to Equation (3) are closer to ideal weights in the middle of the window of length K, than at the end. This is because on average the weight most closely reflects the true channel characteristics at that median time.

Although a window-centered weight can not be exploited to improve weight generation itself, it can be used to generate better antenna array output signals for data detection by existing base station 100. The approach is to shift the weights used to generate the output signal, by an amount of K/2 symbols, that is, to the middle of the window. Therefore, as implemented in the system and method of the invention, outputs are generated as:

$$y(k)=w^T(k-K/2)x(k) \qquad (4)$$

where w(k−K/2)=w(162), for k−K/2>162, with K assumed even in an IS-136 scheme.

Figure 1:
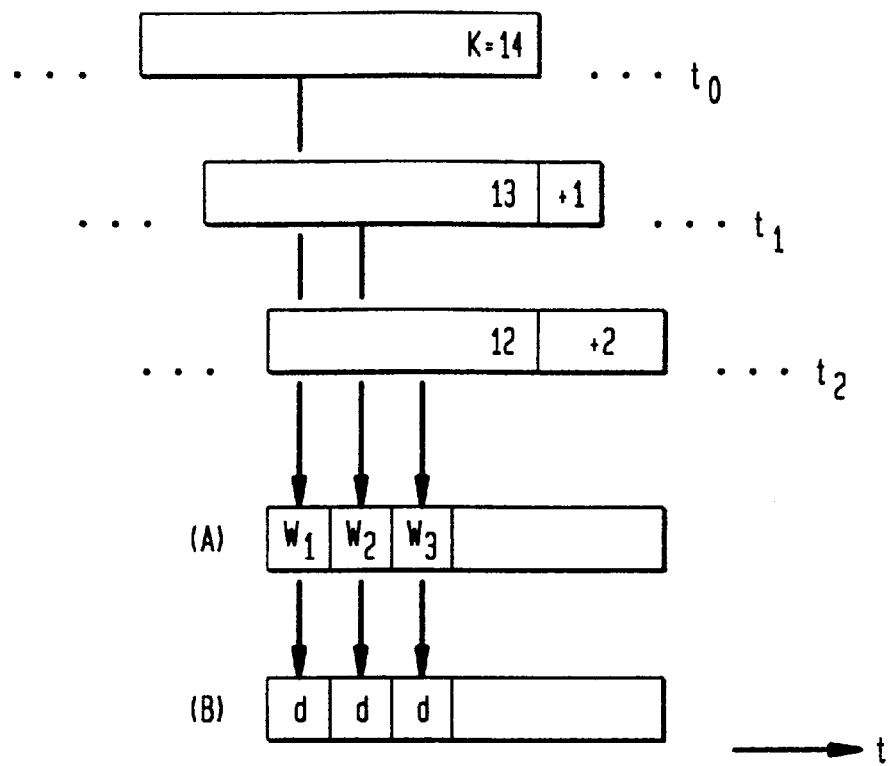
FIG. 1 illustrates a data flow diagram of the weight application technique, according to the invention.
Figure 2:
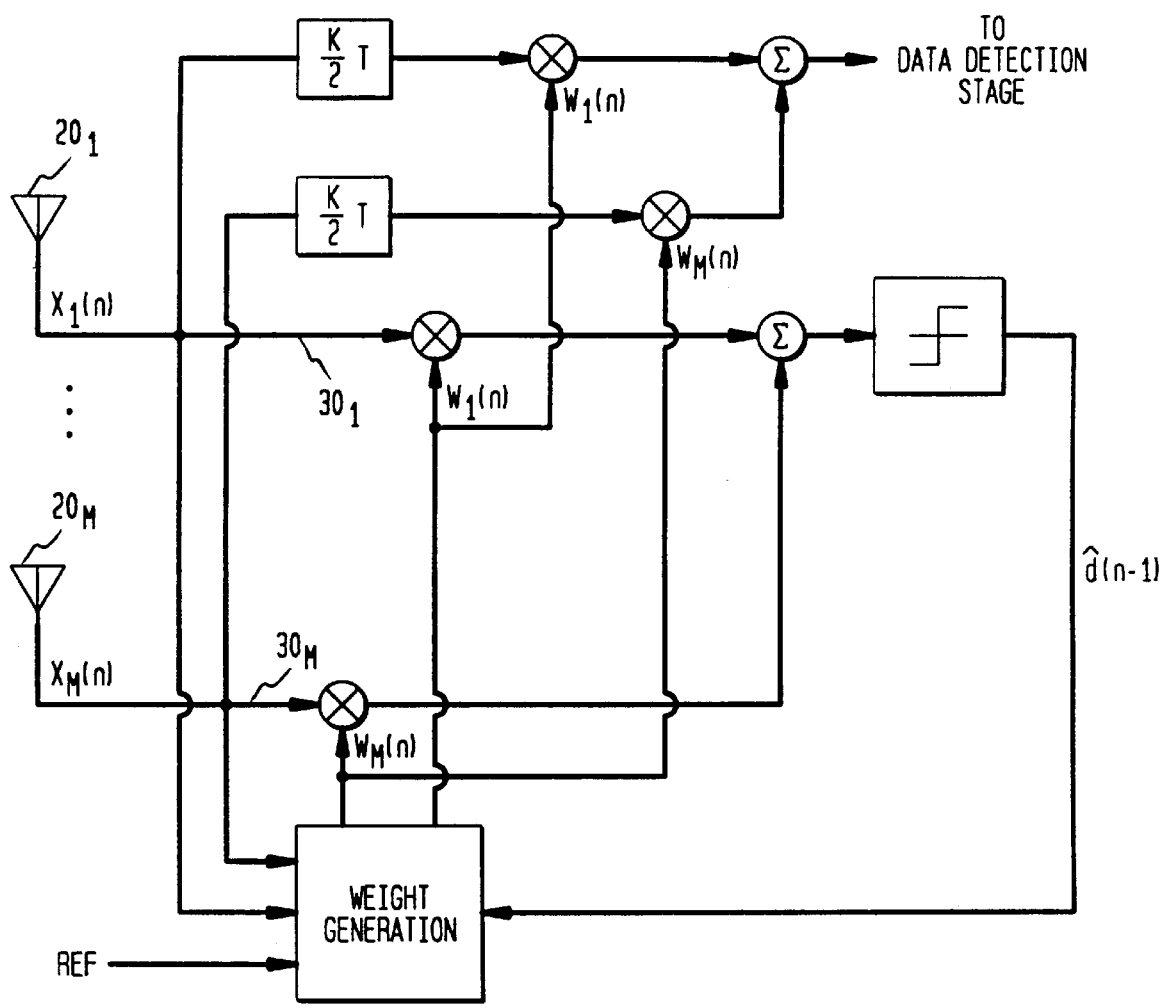
FIG. 2 illustrates a block diagram of elements of a communication apparatus using the weight application technique, according to the invention.

As illustrated in FIGS. 1 and 2, this may be implemented in a two-pass processing arrangement. In the first pass (A), a frame of IS-136 data is processed to generate weights, but not to derive the actual output signal. In the second pass (B), the weights, which were generated using the coherently-sliced data-derived reference signals in first pass (A), are shifted so as to be applied to the data in the middle of the window, for the purpose of generating the array output signal. For instance, weights at time $t_1$ are applied to the middle of the K=14 window, as schematically illustrated in FIG. 1. During these processing steps, the data and weights are stored in electronic memory 60.

Because the weights generated within the window of K symbols are now applied at the center of that window, significant gain can be achieved. This is because the array output signal produced at a given time is based on weights which more accurately reflect the channel condition at that time.

In addition, further improvement is had from time shifting of the weights when the reference signal 80 is coherently detected, while the output data is differentially detected. In this aspect, shifting the application of the weight into the window of samples used to generate that weight causes the resulting output to be biased by the noise sample present when the weight was generated, when the detected output otherwise would not.

As illustrated in FIGS. 1 and 2, in the advantageous implementation of the invention, the processor 40 and related circuitry processes the 14-symbol window in coherent fashion, using absolute phase, whereas data detection stages use differential detection. By applying the current weight not to the next-arriving signal sample but to a window-centered signal sample, the array output signal y(k) is developed using weights incorporating the noise present at the instant of time the signal samples arrived. As a result, the BER with differential detection of the antenna array output decreases to approach that of coherent detection.

Specifically, this occurs when coherent detection makes no detection error, but differential detection would. This reduction occurs with any time shift of the weights into the window, that is a time shift of any amount from 1 to K. Moreover from the perspective of bridging coherent and differential detection, time-shifting of the weight into any portion of the window results in decreased BER with time shifting, even with a single antenna.

The effect of this differential weight bias increases with decreasing K, while the effect of the time shift with channel variation decreases with decreasing K. For the realistic case of K=14 with 184 Hz fading, the inventors have discovered that the reduction in BER due to weight bias with time shifting is somewhat greater (about 60% of total reduction) than that due to the reduced effect of channel variation with time shifting. Of course, the differential weight bias effect is eliminated when coherent detection is used by existing base station 100.

Figure 8:
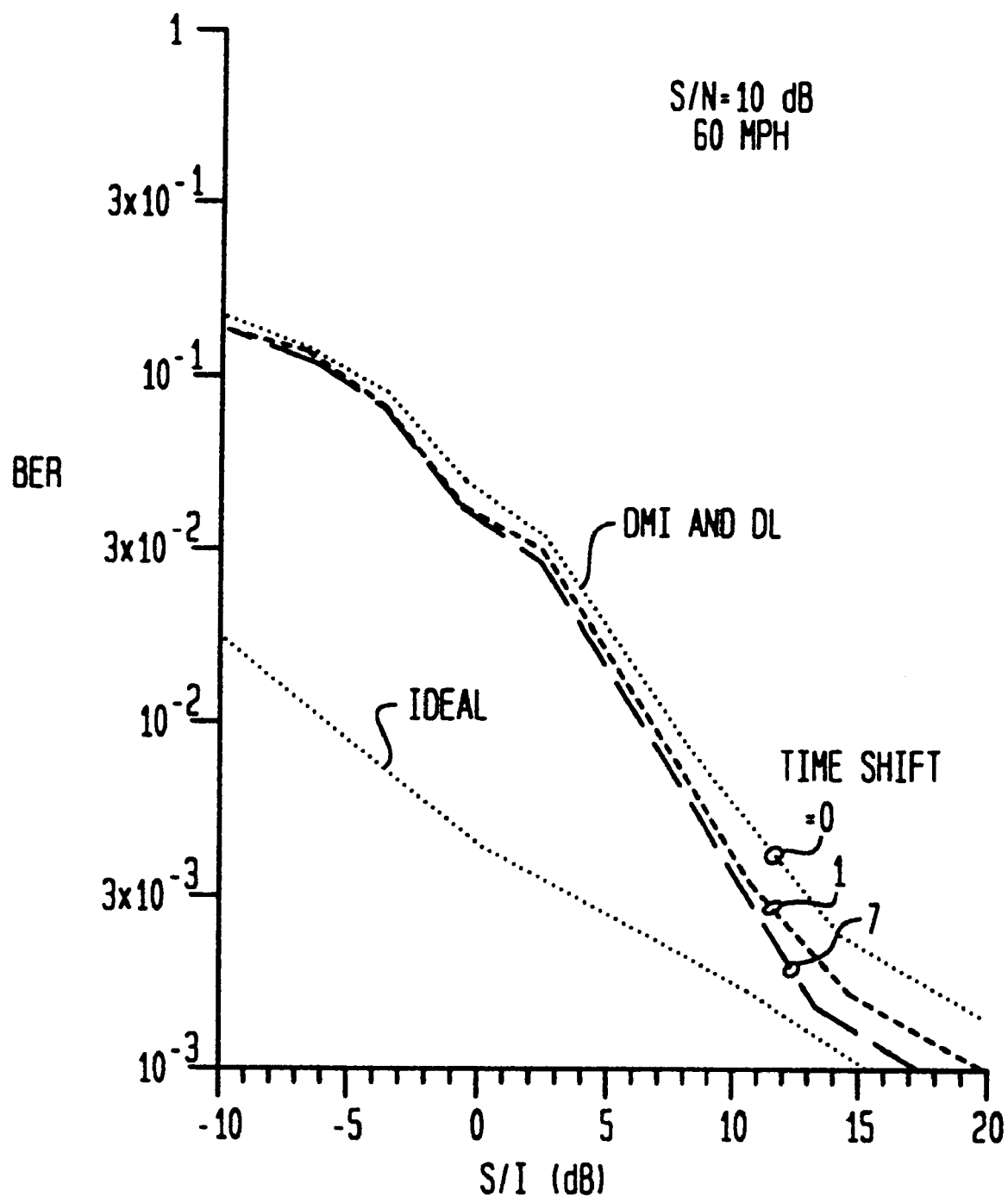
FIG. 8 illustrates data showing the results of applying the sampling system and method of the invention to certain communication environments.

FIG. 8 illustrates BER versus SNR (or S/N) with S/I (Signal to Interference)=0 dB without time shifted weights, and using time shifts of 1 and 7 for K=14. (Diagonal loading, as described in the aforementioned copending application, is also used). As illustrated, a time shift of 1, which corresponds to the improvement mainly due to weight bias, results in a gain that is nearly equal to that with a time shift of 7. Thus, the effect of weight bias is greater than that due to the reduction of channel variation. It may also be noted that gain increases with decreasing BER.

The foregoing description of the system and method of the invention is illustrative, and variations in construction and implementation will occur to persons skilled in the art. For instance, while an empirically derived window length of 14 has been illustrated, other lengths could be used, as could protocols other than IS-136. The invention is accordingly intended to be limited only by the following claims.

What is claimed is:

1. A method for processing received signal samples containing a differentially-encoded data stream, comprising the steps of:
   coherently detecting a reference signal from a weighted sum of at least two of the received signal samples weighted by a plurality of previously generated weights;
   generating a a next plurality of weights based on a set of the received signal samples and the reference signal; and
   applying the next plurality of weights to at least one of the signal samples in the set, to generate an output signal.

2. The method of claim 1 wherein the set of received signal samples comprises a predetermined window of the signal samples.

3. The method of claim 2 further comprising the step of:
   applying the weight at substantially the middle of the predetermined window.

4. The method of claim 3 wherein the signal samples comprise the data of an IS-136 frame.

5. The method of claim 4 wherein the predetermined window comprises between 1 and 14 symbol periods.

6. The method of claim 5 wherein a predetermined frame comprises 14 symbol periods.

7. The method of claim 6 wherein the output signal is a mobile communication signal.

8. The method of claim 7 wherein the mobile communication signal is an IS-136 signal.

9. An apparatus for processing received signal samples containing a data stream, comprising:
   a weight generation unit for generating a plurality of weights based on a set of received signal samples and a reference signal that is coherently detected from a weighted sum of at least two of the received signal samples; and
   a weight application unit, operatively connected to the weight generation unit, for applying the plurality of weights to at least one of the received signal samples in the set, to generate an output signal.

10. The apparatus of claim 9 wherein the set of received signal samples comprises a predetermined window of the data stream.

11. The apparatus of claim 10 wherein the weight application unit applies the weight at substantially the middle of the predetermined window.

12. The apparatus of claim 11 wherein the data stream comprises the data of an IS-136 frame.

13. The apparatus of claim 12 wherein the predetermined window comprises between 1 and 14 symbol periods.

14. The apparatus of claim 13 wherein the predetermined frame comprises 14 symbol periods.

15. The apparatus of claim 14 wherein the output signal is a mobile communication signal.

16. The apparatus of claim 15 wherein the mobile communication signal is transmitted according to the IS-136 standard.

17. An apparatus for processing signals, comprising:
   a coherent detection unit for coherently detecting a reference signal from a differentially-encoded data stream weighted by a plurality of previously generated weights;

a weight generation unit for generating a next plurality of weights according to a predetermined window of the reference signal detected by the coherent detection unit; and a shifting unit for shifting the next plurality of weights to be applied to signal samples within the predetermined window, to thereby provide an output signal.

18. The apparatus of claim 17 further comprising a processing unit for applying the weight to the signal samples within the predetermined window.

19. The apparatus of claim 18 wherein the reference signal comprises a coherently-sliced data-derived reference signal, and the weight generation unit generates the weight using a predetermined window of 1 to 14 symbol periods in an IS-136 frame.

20. The apparatus of claim 19 wherein the data stream comprises the data portions of an IS-136 frame.

21. The apparatus of claim 20 wherein the output signal is a mobile communication signal.

22. The apparatus of claim 21 wherein the mobile communication signal is transmitted according to the IS-136 standard.

* * * * *